United States Patent [19]

Evans

[11] Patent Number: 4,663,794
[45] Date of Patent: May 12, 1987

[54] PLASTIC PIPE SCRAPER

[75] Inventor: Harold J. Evans, Perkins, Okla.

[73] Assignee: Central Plastics Company, Shawnee, Okla.

[21] Appl. No.: 748,478

[22] Filed: Jun. 25, 1985

[51] Int. Cl.$^4$ ................................................ B08B 9/02
[52] U.S. Cl. ........................... 15/104.04; 15/104.01 P; 82/4 D
[58] Field of Search ..................... 15/104.01 P, 104.04, 15/236 R; 82/4 R, 4 D

[56] References Cited

U.S. PATENT DOCUMENTS 2,124,757  7/1938  Vaughan ...................... 15/104.01 P
3,112,506  12/1963  Kane ............................... 15/104.01 P
4,079,477  3/1978  Helt et al. ...................... 15/104.01 P Primary Examiner—Edward L. Roberts
Attorney, Agent, or Firm—Laney, Dougherty, Hessin & Beavers

[57] ABSTRACT

A plastic pipe scraper for scraping selected portions of the exterior surfaces of plastic pipe sections is provided. The apparatus is comprised of a frame member having a handle attached thereto adapted to fit over the plastic pipe sections, a scraper blade carrying member pivotally attached to one end of the frame member, a scraper blade attached to the blade carrying member and adjustable spring means attached to the frame member and to the blade carrying member for urging the scraper blade with selected force into contact with the external surfaces of the pipe sections.

3 Claims, 5 Drawing Figures

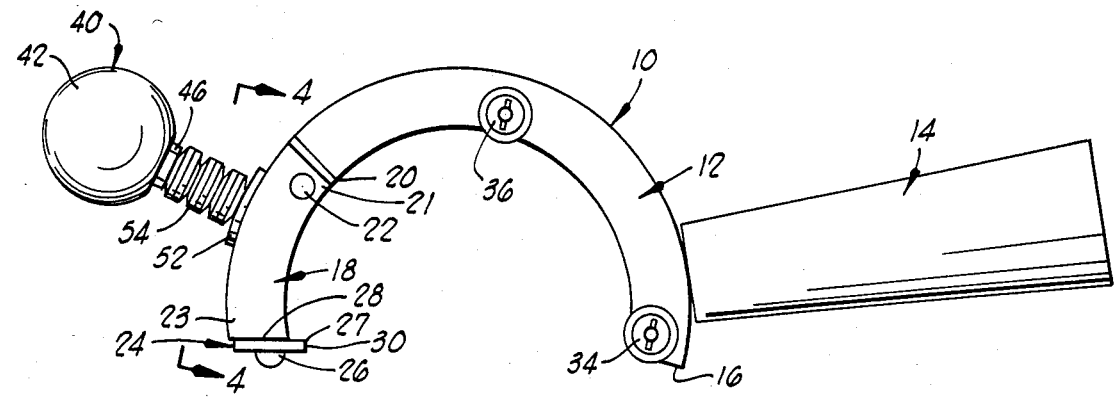
FIG. 1
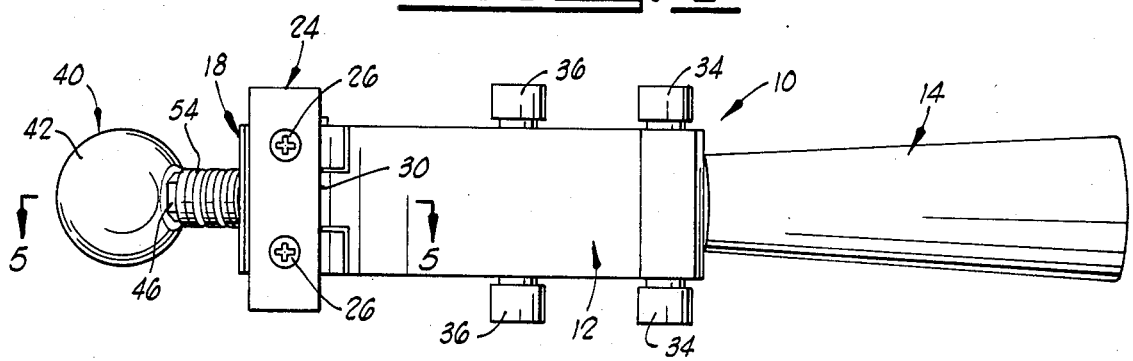
FIG. 2
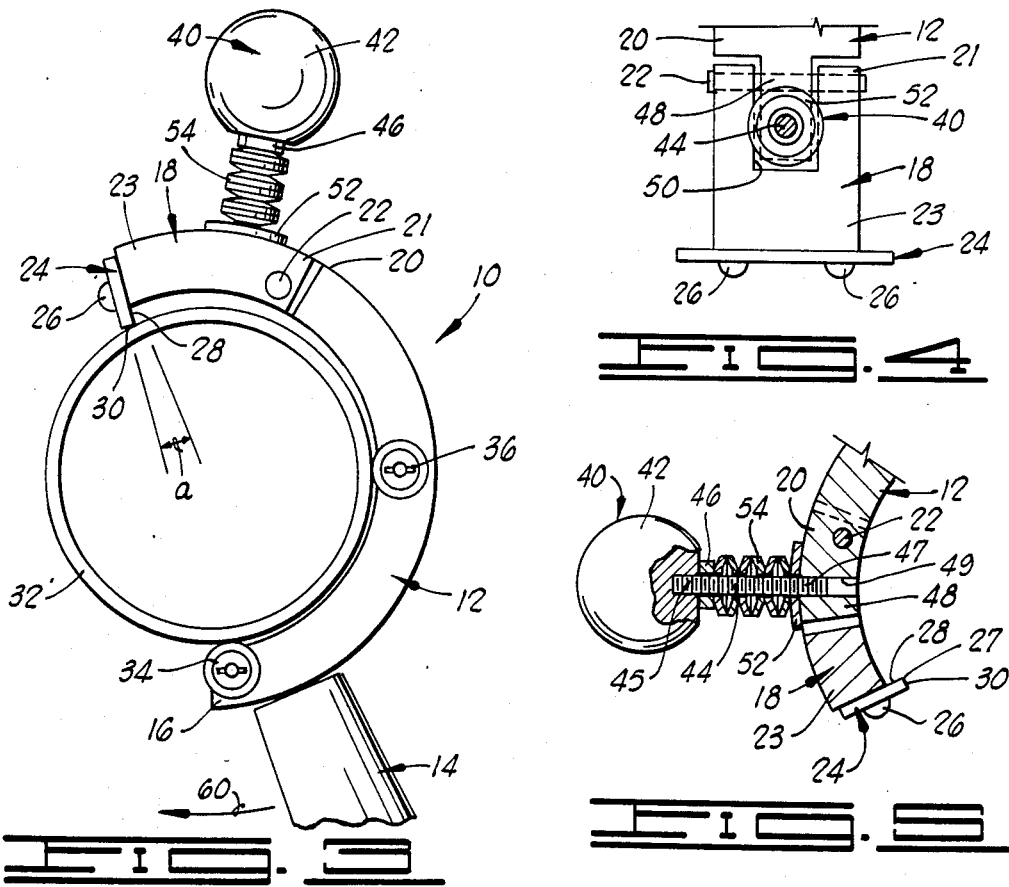
FIG. 3
FIG. 4
FIG. 5

PLASTIC PIPE SCRAPER

BACKGROUND OF THE INVENTION

1. Field of the Invention

The present invention relates generally to a plastic pipe scraper, and more particularly, to apparatus for scraping selected portions of the external surfaces of plastic pipe.

2. Description of the Prior Art

Plastic pipe systems comprised of plastic pipe sections connected to plastic pipe fittings such as couplings, tees and elbows have been used for a variety of purposes heretofore, e.g., the domestic distribution of natural gas. In such systems, the pipe sections and fittings are often fused or welded together by the application of electric heat thereto. That is, electric resistance heating elements are provided in the plastic pipe fittings adjacent the inside surfaces thereof and when the plastic pipe systems are constructed, the inside surfaces of the fittings are welded to adjacent outside surfaces of plastic pipe sections by applying electric power to the resistance heating elements of the fittings. The heating element of, for example, a sleeve, heats the inside surface of the sleeve and the outside surface of the end of a plastic pipe section positioned within the sleeve to a temperature level which causes the thermoplastic materials of the sleeve and pipe section to be fused or welded together. Examples of electric heat weldable thermoplastic fittings are those described in U.S. Pat. Nos. 4,147,926, issued Apr. 3, 1979, and 4,349,219, issued Sept. 14, 1982.

It has been found that in order to insure that good welds are formed between plastic pipe sections and electrically weldable plastic pipe fittings, the portions of the outside surfaces of the plastic pipe sections to be welded to the fittings must be scraped whereby the oxidized outer film of plastic material is removed therefrom. While various plastic pipe scraper apparatus have been developed and used for this purpose heretofore, such apparatus have been difficult to use, have often caused gouges to be formed in the pipe and have generally proven to be unsatisfactory. Thus, there is a need for a plastic pipe scraper which can be efficiently utilized to scrape selected portions of the external surfaces of plastic pipe sections.

SUMMARY OF THE INVENTION

A scraper apparatus for scraping selected portions of the external surfaces of plastic pipe sections is provided. The apparatus includes a frame member adapted to fit over a portion of the external surface of a plastic pipe section having handle means attached thereto. A scraper blade carrying member is pivotally attached to one end of the frame member and a scraper blade is attached to the blade carrying member. Adjustable spring means are attached to the frame member and to the scraper blade carrying member for urging the scraper blade with selected force into contact with the external surfaces of pipe sections being scraped.

It is, therefore, a general object of the present invention to provide an improved plastic pipe scraper.

A further object of the present invention is the provision of efficient and reliable apparatus for scraping selected portions of the external surfaces of plastic pipe sections preparatory to welding the sections to plastic pipe fittings.

Yet another object of the present invention is the provision of a plastic pipe scraper which does not bind on or gouge the external surfaces of plastic pipe being scraped.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. is a side view of the plastic pipe scraper of the present invention.

FIG. 2 is a bottom view of the scraper of FIG. 1.

FIG. 3 is a side view of the scraper of FIGS. 1 and 2 shown mounted on a pipe section.

FIG. 4 is a sectional view taken along line 4—4 of FIG. 1.

FIG. 5 is a sectional view taken along line 5—5 of FIG. 2.

DESCRIPTION OF PREFERRED EMBODIMENTS

Referring now to the drawings, the plastic pipe scraper of the present invention is illustrated and generally designated by the numeral 10. The scraper 10 is comprised of an arcuate frame member 12 which is adapted to fit over the external surface of a plastic pipe section. A handle 14 is attached to the frame member 12 adjacent one end 16 thereof and a scraper blade carrying member 18 is pivotally attached at the other end 20 of the frame member 12 by a pin 22.

The scraper blade carrying member 18 is also preferably of arcuate shape and is pivotally attached at an end 21 thereof to the frame member 12 whereby it is free to move towards or away from the end 16 of the frame member 12. A scraper blade 24, preferably in the form of a rectangular plate, is removably attached to the opposite end 23 of the scraper blade carrying member 18 by means of a pair of bolts 26. As best shown in FIG. 3, the rectangular plate scraper blade 24 is positioned whereby the intersection 27 of the interior face 28 and bottom side 30 of the scraper blade comprises the scraping edge of the blade which contacts the external surface of a pipe section on which the apparatus 10 is mounted.

As shown in FIGS. 1-3, a first pair of rollers 34 is rotatably attached to opposite sides of the frame member 12 adjacent the end 16 thereof and a second pair of rollers 36 is rotatably attached on opposite sides of the frame member 12 at points substantially intermediate the ends thereof. The rollers 34 and 36 are of a size and are positioned on the frame member 12 whereby they contact the pipe section on which the apparatus 10 is mounted and facilitate the easy movement of the scraper 10 thereon.

An adjustable spring means, generally designated by the numeral 40, is attached to the frame member 12 and to the scraper blade carrying member 18 for urging the scraper blade 24 attached to the member 18 with selected force into contact with the external surfaces of a pipe section upon which the scraper 10 is mounted. As shown best in FIGS. 4 and 5, the adjustable spring means 40 are comprised of a knob 42 which is threadedly or otherwise attached to a threaded shaft 44. In the form illustrated, the knob 42 is threadedly connected to the outer end 45 (FIG. 5) of the shaft 44 and locked thereto by means of a lock nut 46. The opposite end 47 of the threaded shaft 44 is threadedly engaged in a threaded bore 49 disposed in the frame member 12. The end 20 of the frame member 12 includes a tongue portion 48 which extends into a groove 50 formed in the end 21 of the scraper blade carrying member 18. The pin 22 extends through corresponding openings in the tongue and groove wall portions of the members 12 and 18, and the threaded bore 49 containing the end of the threaded shaft 44 is disposed in the tongue portion 48 of the frame member 12. An enlarged washer 52 is positioned on the shaft 44 adjacent and in contact with the groove forming wall portions of the member 18, and a compression spring means 54, such as a plurality of Bellville washers, is disposed over the shaft 44 between the washer 52 and the lock nut 46. In operation of the adjustable spring means 40, when the knob 42 is rotated in a direction which causes the threaded shaft 44 to be threaded into the bore 47 in the frame member 12, the spring means 54 are compressed which increases the force exerted by the spring means on the washer 52 and the scraper blade carrying member 18 in the direction towards the end 16 of the frame member 12. When the knob 42 is rotated in the opposite direction, the force exerted on the blade carrying member 18 is reduced.

In operation of the scraper 10 and referring specifically to FIG. 3, the scraper 10 is mounted on a pipe section 32 over a selected portion of the external surface of the pipe section which is to be scraped. The frame member 12 is positioned on the pipe section 32 so that it can be rotated on an axis coincident with the longitudinal axis of the pipe section and whereby the scraper blade 24 contacts the external surfaces of the pipe section on a line substantially parallel to the longitudinal axis thereof. As indicated previously, the scraper blade is preferably a rectangular plate blade positioned whereby the scraping edge of the blade (the intersection 27 of the interior face 28 and the inwardly facing side 30 of the blade) contacts the external surface of the pipe section being scraped. More specifically, the scraper blade 24 is positioned at an angle with respect to a radial plane intersecting the longitudinal axis of the pipe section 32 (the angle designated "a" on FIG. 3) in the range of from about 12 degrees to about 18 degrees, preferably 15 degrees, so that the scraping edge of the blade contacts the pipe section.

The rectangular scraper blade 24 provides four scraping edges which can be utilized without sharpening the blade, i.e., the blade 24 can be repositioned on the blade carrying member 18 to contact the pipe section being scraped with four different scraping edges, i.e., the four intersections between the faces and longest sides of the blade. When necessary, the blade can be simply sharpened without affecting the scraping process or cut depth.

The arcuate frame member 12 is of a length such that when the scraper 10 is fitted over a pipe section to be scraped, the portion of the exterior surface of the pipe section positioned between the contact points of the scraper blade 24 and the rollers 34 covers an arc of a circle greater than 180 degrees. This insures that the scraper 10 remains attached to the pipe section while being used to scrape the pipe section.

Upon positioning the scraper 10 over the selected external surfaces of the pipe section 32 to be scraped, the knob 42 is rotated to compress the spring means 54 a desired amount thereby urging the scraper blade 24 into contact with the external surface of the pipe section with a selected force. The scraper 10 is then rotated by means of the handle 14 in the direction indicated by the arrow 60 (FIG. 3) to cause the scraper blade 24 to scrape the external surfaces of the pipe section 32. As the scraping operation is carried out, the knob 42 can be adjusted to bring about desired results.

As will be understood, depending upon the particular pivotal travel of the blade carrying member 18 with respect to the frame member 12 of the scraper 10, the scraper 10 can be utilized to scrape one or more sizes of plastic pipe sections. If desired, the curvature of the frame member 12 can be made adjustable whereby a single scraper 10 fits a variety of sizes of pipe sections. These and numerous other changes in the arrangement and construction of parts will suggest themselves to those skilled in the art, which changes are encompassed within the spirit of this invention as defined by the appended claims.

What is claimed is:

1. A plastic pipe scraper apparatus comprising:
    a frame member adapted to fit over a selected portion of the external surface of a plastic pipe section and rotatable on an axis coincident with the longitudinal axis of said pipe section;
    a plurality of roller means rotatably attached to said frame member for movably contacting said external surface of said pipe section, at least a portion of said roller means being positioned at one end of said frame member;
    handle means attached to said frame member for rotating said frame member on said pipe section;
    a scraper blade carrying member pivotally attached to the end of said frame member opposite the end thereof to which said portion of said roller means is positioned, said carrying member being free to move towards or away from said end of said frame member to which said portion of said roller means is positioned;
    a scraper blade attached to said scraper blade carrying member, the scraping edge of said scraper blade contacting the external surface of said pipe section on a line substantially parallel to the longitudinal axis thereof, and said frame member being of a length such that when fitted over a pipe section, the portion of the external surface of said pipe section positioned between the contact points of said scraper blade and at least a portion of said roller means covers an arc of a circle greater than 180°; and
    adjustable spring means attached to said frame member and to said scraper blade carrying member for urging said scraper blade with selected force into contact with said external surface of said pipe section.

2. A plastic pipe scraper comprising:
    an arcuate frame member adapted to fit over a selected portion of the external surface of a plastic pipe section;
    a plurality of roller means attached to said frame member for movably contacting said pipe section;
    handle means attached to said frame member for rotating said frame member over selected portions of the external surface of said pipe section on an axis coincident with the longitudinal axis thereof;
    a scraper blade carrying member pivotally attached to said frame member at one end thereof, said carrying member being free to move towards or away from an end of said frame member opposite said end of said frame member to which it is attached;

a rectangular plate scraper blade attached to said scraper blade carrying member positioned whereby the intersection of an interior face and a side of said blade comprises the scraping edge of said blade which contacts said external surface of said pipe section, and said arcuate frame member being of a length such that when fitted over said pipe section, the portion of the exterior surface of said pipe section positioned between the contact points of said scraper blade and at least a portion of said roller means covers an arc of a circle greater than 180 degrees; and adjustable spring means attached to said frame member and to said scraper blade carrying member for urging said scraper blade with selected force into contact with said external surface of said pipe section.

3. The scraper apparatus of claim 2 wherein said interior face of said rectangular plate scraper blade is positioned at an angle of about 15 degrees with a radial plane intersecting the longitudinal axis of said pipe section.

* * * * *